US007042923B1

(12) United States Patent
McCrank et al.

(10) Patent No.: US 7,042,923 B1
(45) Date of Patent: May 9, 2006

(54) METHOD AND APPARATUS FOR FREQUENCY HOPPING IN A SPREAD SPECTRUM DIGITAL CORDLESS TELEPHONE SYSTEM

(75) Inventors: Christopher L. McCrank, Austin, TX (US); Javier V. Magaña, Austin, TX (US)

(73) Assignee: Legerity, Inc., Austin, TX (US)

( * ) Notice: Subject to any disclaimer, the term of this patent is extended or adjusted under 35 U.S.C. 154(b) by 0 days.

(21) Appl. No.: 09/361,893

(22) Filed: Jul. 27, 1999

(51) Int. Cl.
*H04K 1/00* (2006.01)
*H04B 15/00* (2006.01)
*H04L 27/30* (2006.01)

(52) U.S. Cl. .................. 375/133; 375/132; 375/344; 370/437

(58) Field of Classification Search ............. 375/133, 375/134, 132, 136, 220, 344; 331/1 A; 455/76, 455/67.1, 550, 67.11, 550.1; 370/328, 336, 370/437
See application file for complete search history.

(56) References Cited

U.S. PATENT DOCUMENTS

| 4,654,859 A | * | 3/1987 | Kung et al. ............... 375/136 |
| 5,408,506 A | * | 4/1995 | Mincher et al. ........... 375/134 |
| 5,590,410 A | * | 12/1996 | Deutsch et al. ........... 455/76 |
| 5,966,665 A | * | 10/1999 | Taki ....................... 455/463 |

* cited by examiner

*Primary Examiner*—Khai Tran
*Assistant Examiner*—Edith Chang
(74) *Attorney, Agent, or Firm*—Williams, Morgan & Amerson, P.C.

(57) ABSTRACT

A communications system includes a first and second communication unit coupled together via a radio communications link. In one embodiment, the communications system takes the form of a frequency hopped, spread spectrum digital cordless telephone, where the first unit is a base unit and the second unit is the remote unit. The first and second communication units are respectively set to transmit and receive communication over a first radio frequency during a first time frame, select a second radio frequency during the first time frame, and set to respectively receive and transmit communication over the second radio frequency during a second time frame.

20 Claims, 4 Drawing Sheets

METHOD AND APPARATUS FOR FREQUENCY HOPPING IN A SPREAD SPECTRUM DIGITAL CORDLESS TELEPHONE SYSTEM

BACKGROUND OF THE INVENTION

1. Field of the Invention

The present invention relates generally to communications, and, more particularly, to a method and apparatus for frequency hopping in a spread spectrum digital cordless telephone system.

2. Description of the Related Art

The telecommunications industry has undergone explosive growth over the past several years. A significant contribution to this growth has been the high demand for radio communication services, such as cordless telephone service. Cordless telephones provide greater flexibility than traditional landline phones by permitting a user to move freely and not be physically restricted by a telephone cord. Although other types of radio telephones exist on the market (e.g., cellular, PCS, etc.), cordless telephones are a much cheaper alternative for providing telephone service within a limited operating range, such as a home, for example. Accordingly, cordless phones account for a significant portion of the vast radio telecommunications market.

A cordless telephone consists of a base unit and a remote unit that communicate over a radio frequency (RF) link. Generally, the remote unit takes the form of a cordless handset. The base unit couples to the public switched telephone network (PSTN) to provide telephonic services to a user of the remote unit via the RF link.

When the cordless telephone was initially introduced, the frequency of the radio channel used between the base and remote units was typically constant. The use of a single radio channel between the base and remote units was not desirable, however, because it made the radio link more prone to interference by other radio systems. Additionally, using a single radio channel also made eavesdropping on telephone conversations relatively easy to accomplish.

To attempt to alleviate these problems, some cordless phones were equipped such that the user could manually change the radio channel between the base and remote units, which was usually accomplished by a "channel change" button on the remote unit. These phones, however, were not very successful because the user was inconvenienced by having to manually change the radio channel. And, when the channel was changed, there typically was not enough variation in frequency between the limited number of radio channels to completely eliminate the radio interference. Furthermore, the limited number of channels used by these phones also did not significantly reduce the possibility of eavesdropping.

When the frequency-hopped spread spectrum (FHSS) cordless phone was introduced, it significantly reduced the aforementioned problems of radio interference and eavesdropping commonly associated with the previous model cordless phones. The base and remote unit of an FHSS cordless phone synchronously hop across a pseudorandomly-ordered series of frequencies, which greatly improves the clarity, range, and security of communication between the base and remote units.

Currently, however, FHSS cordless phones use "dwell" time (i.e., time spent on a given frequency) to change the base and remote unit's radio transceivers to a new frequency of the pseudorandomly-ordered frequency pattern. Because the carrier frequencies are unstable as they are changed, no information can be transmitted or received during this dwell time. To accommodate an effective throughput data rate of 32 kbits/sec, which is required for full-duplex digitized voice transmission, the voice data transmitted between the base and remote units must be queued and transmitted at a much higher rate over the radio link. This higher data rate results in a decreased signal-to-noise ratio, which diminishes the sensitivity and range of the radio link between the remote and base units of the FHSS phone.

The present invention is directed to overcoming, or at least reducing the effects of, one or more of the problems set forth above.

SUMMARY OF THE INVENTION

In one aspect of the present invention, a method is provided for transmitting communication between first and second communication units over a plurality of radio frequencies. The method comprises setting the first and second communication units to respectively transmit and receive communication over a first radio frequency during a first time frame. A second radio frequency is selected during the first time frame. The first and second communication units are set to respectively receive and transmit communication over the second radio frequency during a second time frame.

In another aspect of the present invention, an apparatus is provided that includes a first and second communication unit for communication therebetween over a plurality of radio frequencies. The first and second communication units each include a controller. The controller is adapted to set the first and second communication units to respectively transmit and receive communication over a first radio frequency during a first time frame, select a second radio frequency during the first time frame, and set the first and second communication units to respectively receive and transmit communication over the second radio frequency during a second time frame.

BRIEF DESCRIPTION OF THE DRAWINGS

The invention may be best understood by reference to the following description taken in conjunction with the accompanying drawings, in which like reference numerals identify like elements, and in which.

Figure 1:
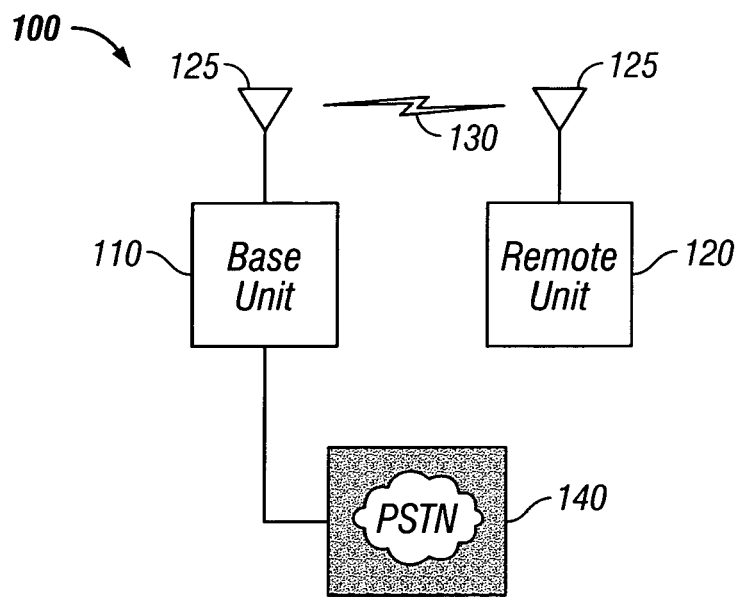
FIG. 1 is a simplified block diagram of a communications system including a base unit and a remote unit in accordance with one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Turning now to the drawings, and specifically referring to FIG. 1, a simplified block diagram of a communications system 100 is shown in accordance with the present invention. The communications system 100 includes a base unit 110 and a remote unit 120. The base and remote units 110, 120 each include an antenna 125 for communication therebetween over a radio frequency (RF) link 130. In the illustrated embodiment, the communications system 100 is embodied as a digital cordless telephone system employing a frequency-hopped, spread spectrum (FHSS) communications protocol over the RF link 130. The RF link 130 includes a pair of frequencies, one of which is used by the base unit 110 to transmit communication signals to the remote unit 120, and the other frequency being used by the remote unit 120 to transmit signals to the base unit 110. Each frequency pair used to establish communication between the base and remote units 110, 120 constitutes a radio channel.

In accordance with one embodiment, the base unit 110 is coupled to a public switched telephone network (PSTN) 140 to provide telephonic services from the PSTN 140 to the remote unit 120. In the illustrated embodiment, the remote unit 120 takes the form of a cordless handset, and includes the conventional components (i.e., microphone, speaker, dial keypad, battery, etc.) (not shown) that are inherent to the operation of cordless phones. These components are well known to those of ordinary skill in the art, and are not discussed herein to avoid unnecessarily obscuring the present invention.

Figure 2:
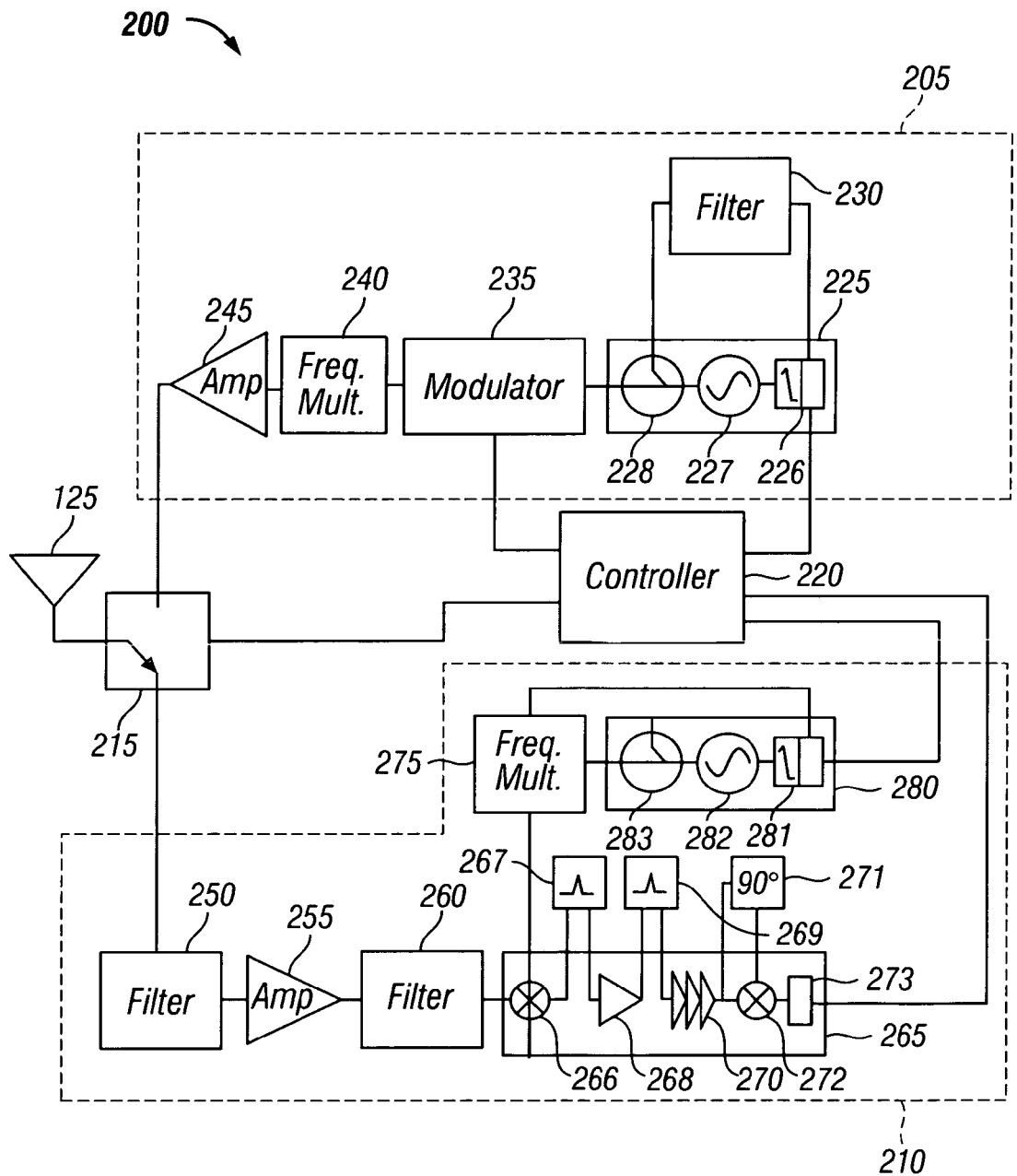
FIG. 2 shows a block diagram of a transceiver unit, which is a component of the base and remote units of FIG. 1.

Turning now to FIG. 2, a detailed block diagram illustrating a radio transceiver unit 200 of the base unit 110 and remote unit 120, for establishing the radio communication link 130 therebetween, is shown. The transceiver unit 200 includes a transmitter 205 for transmitting communication signals from either the base or remote unit 110, 120 to a corresponding "communicating" unit (which could be either the remote or base unit 120, 110, respectively). The transceiver unit 200 further includes a receiver 210 for receiving communication signals through the RF link 130 via the antenna 125. In accordance with one embodiment, the base unit 110 and the remote unit 120 transmit and receive in the 902–928 MHz ISM band in accordance with current Federal Communications Commission (FCC) regulations.

When communication signals are received by the transceiver unit 200 at the antenna 125, a transmit/receive (TX/RX) switch 215 couples the antenna 125 to the receiver 210 for processing the incoming communication signals over the RF link 130. Conversely, when communication signals are transmitted by the transceiver unit 200, the TX/RX switch 215 couples the transmitter 205 to the antenna 125, thereby transmitting communication signals via the RF link 130 to the opposite communicating unit.

A controller 220 controls the transmitter and receiver 205, 210 and the TX/RX switch 215 to enable communication between the base and remote units 110, 120. In the illustrated embodiment, the controller 220 is a PhoX controller manufactured by AMD, Inc. of Sunnyvale, Calif. It will be appreciated, however, that other types of controllers capable of Time-Division-Duplexed (TDD) communication could be used in lieu thereof without departing from the spirit and scope of the present invention.

The controller 220 at the base unit 110 serves as a timing master for the communications system 100, and will select and originate the pseudorandom frequency hopping sequence. The technique for implementing this pseudorandomly-ordered frequency hopping sequence is well known to those of ordinary skill in the art. The controller 220 at the remote unit 120 recognizes, synchronizes to, and tracks the frequency hopping sequence set by the base unit's controller 220 also in accordance with techniques that are well established in the art. Once the frequency hopping pattern is locked by both the base and remote units 110, 120, their respective controllers 220 manage a bursted data stream that conveys the digitized voice and overhead control data information over the radio link 130.

The transmitter 205 includes a transmit frequency synthesizer 225, which generates a carrier frequency that is modulated with a digitized voice signal. A phase-locked loop 226 in the transmit frequency synthesizer 225 receives a reference signal from a reference clock oscillator (not shown), which generates a reference clock signal with a frequency typically at 12.8 MHz. The phase-locked loop 226 divides the reference signal to a particular reference frequency, which is typically on the order of 100 kHz. The reference frequency is used to ensure that the carrier frequency output from the transmit frequency synthesizer 225 is stable. A voltage-controlled oscillator (VCO) 227 generates the carrier frequency upon which the digitized voice signal is modulated. In the illustrated embodiment, the carrier frequency is one-third the frequency of the "over-the-air" communication signals transmitted from the antenna 125 (i.e., the carrier frequency is approximately 300 MHz). Use of a low frequency VCO 227 and tripler combination enables fast lock-up time between frequencies.

A power divider 228 extracts a portion of the signal energy output from the VCO 227 and feeds the signal via a control loop through a filter 230 back to the phase-locked loop 226. This feedback signal is compared by the phase-locked loop 226 with the reference signal from the reference oscillator (not shown). The phase-locked loop 226 controls the VCO 227 by outputting a particular voltage to the VCO 227 dependent upon the comparison of the reference and feedback signals. Accordingly, the carrier frequency output by the VCO 227 could be increased or decreased by the phase-locked loop 226 to ensure a stable carrier frequency output.

A modulator 235 modulates the digitized voice signal with the carrier frequency generated by the VCO 227. A frequency multiplier 240 triples the frequency of the modulated signal from the lower frequency of approximately 300 MHz output from the VCO 227 to a frequency commensurate with the desired over-the-air frequency in the 900 MHz range. A power amplifier 245 amplifies the modulated digital radio signal to a predetermined gain so as to facilitate transmission of the modulated digitized voice signal to the opposite communicating unit via the antenna 125.

The receiver 210 receives the transmitted communication signal (from the opposite communicating unit) over the RF link 130 at the antenna 125. When receiving communication, the TX/RX switch 215 couples the antenna 125 to the receiver 210 (as shown by the position of the arrow illustrated in FIG. 2). A bandpass filter 250, which is coupled to the TX/RX switch 215, filters out undesired frequencies that fall outside the range of the receive frequency band of the base and remote units 110, 120. Such undesired frequencies could be frequencies in the cellular band, as well as several other different types of radio communication bands. The filtered communication signal is then passed through a low noise amplifier 255, and subsequently through another bandpass filter 260 for additional filtering. A frequency shift keying (FSK) demodulator 265, coupled to the bandpass filter 260, demodulates the filtered communication signal to recover the transmitted digital voice signal. A receive frequency synthesizer 280 generates a carrier frequency using a phase-locked loop 281, VCO 282, and power divider 283 in the same manner as the transmit frequency synthesizer 225 described previously. As with the transmit frequency synthesizer 225, the receive frequency synthesizer 280 also generates a low frequency signal (i.e., a frequency of approximately 300 MHz). The frequency of the signal output from the receive frequency synthesizer 280 is subsequently tripled by a frequency multiplier 275 to bring the carrier frequency to the desired 900 MHz band.

A downcoverter 266, within the FSK demodulator 265, couples to the bandpass filter 260 and the frequency multiplier 275. The filtered communication signal output from the bandpass filter 260 is downconverted by mixing the signal with the carrier frequency output from the frequency multiplier 275. The downconverter 266 produces two frequencies, i.e., the sum of the frequencies from the frequency multiplier 275 and the bandpass filter 260 (which is approximately 1.8 GHz), and the difference of the frequencies (which is approximately 10.7 MHz). A narrow band filter 267 removes the summed portion (i.e., 1.8 GHz), leaving the remaining difference frequency of 10.7 MHz (i.e., the intermediate frequency). The signal is subsequently amplified by an amplifier 268, filtered by another filter 269, and then passed through a limiting amplifier 270. Subsequent to passing through the limiting amplifier 270, the signal is phase-shifted by a 90-degree phase shift unit 271, and then downconverted by downconverter 272. A slicing circuit 273 then converts the downconverted analog signal from the downconverter 272 to a digital signal that is fed into the controller 220.

The controller 220 sends data in a time division duplex (TDD) fashion between the base unit 110 and remote unit 120. Accordingly, data flows from the base unit 110 to the remote unit 120 or from the remote unit 120 to the base unit 110, but not in both directions simultaneously. While the base unit 110 is transmitting to the remote unit 120, the base unit receiver 210 and the remote unit transmitter 205 are idle. Conversely, while the remote unit 120 is transmitting to the base unit 110, the base unit transmitter 205 and the remote unit receiver 210 are idle. In accordance with the present invention, while the base unit 110 is transmitting to the remote unit 120, the base unit receiver 210 and the remote unit transmitter 205 are set to their new frequencies according to the pseudorandom frequency hopping sequence. While the remote unit 120 is transmitting to the base unit 110, the base unit transmitter 205 and the remote unit receiver 210 are set to their new frequencies.

Figure 3:
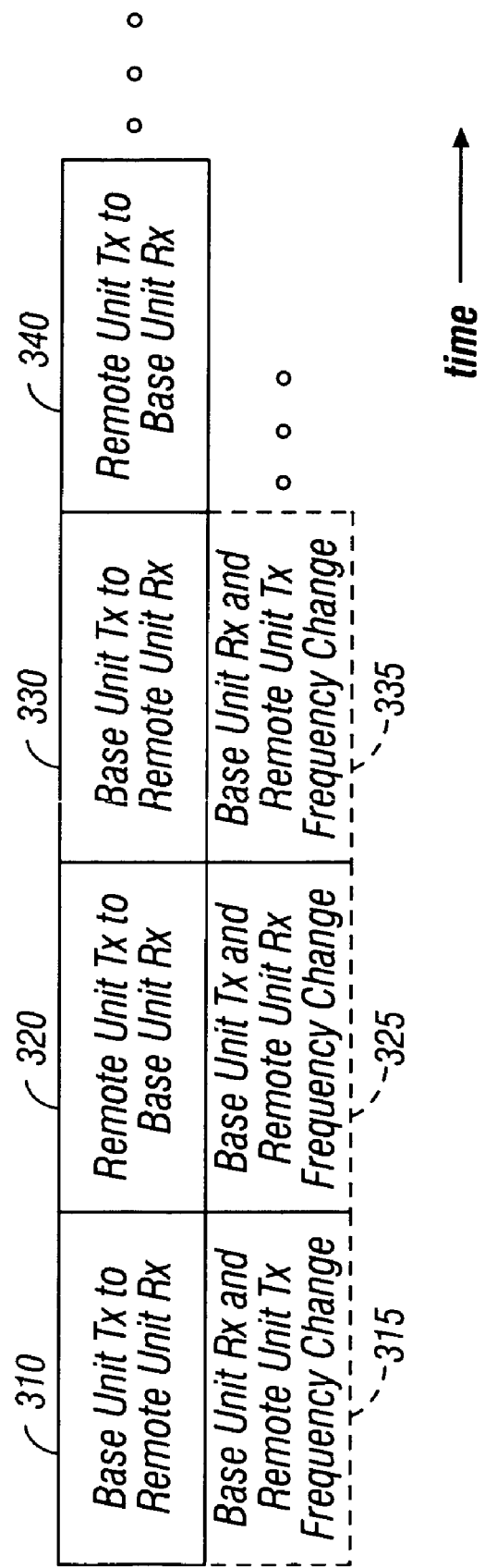
FIG. 3 is a simplified diagram illustrating a frequency hopping technique in accordance with one embodiment of the present invention.

Turning now to FIG. 3, a simplified diagram illustrating the spread spectrum frequency hopping technique in accordance with the present invention is shown. The base unit's transmitter 205 transmits to the remote unit's receiver 210 on a first frequency in a first frame 310. Both the VCO 227 in the base unit's transmitter 205 and the VCO 282 in the remote unit's receiver 210 are tuned to communicate on this same first frequency. While the base unit 110 is transmitting to the remote unit 120 in frame 310, the controller 220 tunes the VCO 282 in the base unit's receiver 210 to receive a second frequency as shown at 315 (which occurs during frame 310). Similarly, the VCO 227 in the remote unit's transmitter 205 is also tuned to the second frequency as the VCO 282 of the base unit's receiver 210. The manner in which the base and remote units 110, 120 synchronize to select the same new frequencies for communication thereover is well known to those of ordinary skill in the art, and will not be discussed herein to avoid unnecessarily obscuring the present invention.

At a second frame 320, the remote unit's transmitter 205 transmits signals to the base unit's receiver 210 over the second frequency that was selected during the first frame 310. While the remote unit 120 is transmitting to the base unit 110 in frame 320, the controller 220 tunes the VCO 227 in the base unit's transmitter 205 to receive a third frequency as shown at 325. The remote unit's receiver 210 also tunes the VCO 282 to the same third frequency. During a third frame 330, the base unit 110 transmits to the remote unit 120 over the third frequency. While this occurs, at 335, the VCO 282 of the base unit's receiver 210 and the VCO 227 of the remote unit's transmitter 205 tune to communicate over a fourth frequency, which is used by the remote unit 120 to transmit to the base unit 110 at frame 340.

As previously mentioned, an effective throughput data rate of 32 kbits/sec is needed for simplex digital voice transmission between the base and remote units 110, 120 in a frequency hopped spread spectrum system to enable adequate voice communication. The "base to remote" and "remote to base" transmissions each account for one-half of the transmitting time. In prior art systems, "dwell" time is used to change to the next frequency in the frequency hopping sequence. In accordance with the present invention, however, the digitized voice data between the base and remote units 110, 120 is sent at only twice the data rate (i.e., a total of 64 kbps). This enables a significant increase in communication quality over the prior art systems which typically need a 96 kbps data rate to compensate for the transmission time and the dwell time.

Figure 4:
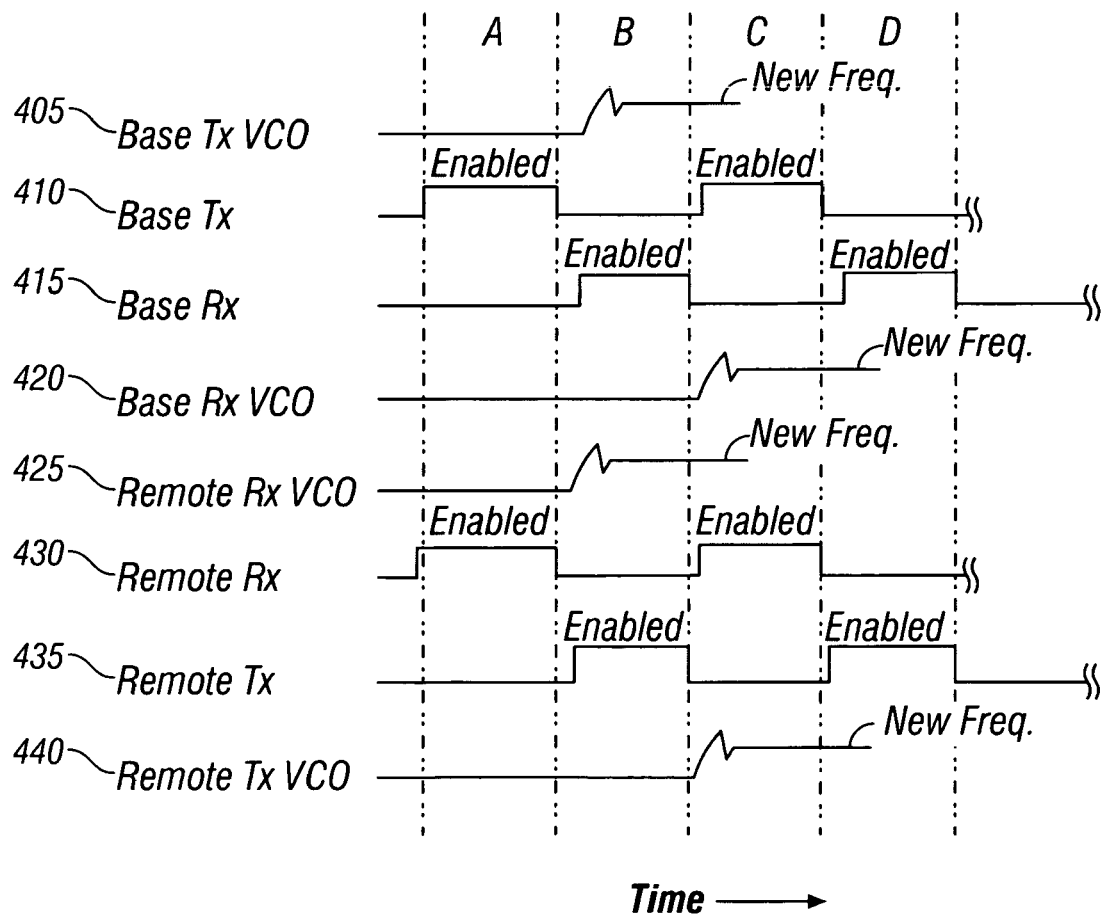
FIG. 4 shows a system timing diagram for illustrating a timing sequence for the frequency hopping technique of the present invention.

Turning now to FIG. 4, a system timing diagram illustrating the timing sequence for the frequency hopping technique of the present invention is shown. During time frame A, the base unit's transmitter 205 is enabled as shown at 410, and is transmitting on a first frequency to the remote unit's receiver 210, which is enabled at 430. At time frame B, the base unit's transmitter 205 and the remote unit's receiver 210 become disabled at 410 and 430, respectively. The base unit's receiver 210 and the remote unit's transmitter 205 become enabled at 415 and 435, respectively, thus permitting the remote unit 120 to transmit to the base unit 110. While the remote unit 120 is transmitting to the base unit 110, the VCO 227 of the base unit's transmitter 205 changes to a second frequency as shown at 405, and the VCO 282 of the remote unit's receiver 210 also simultaneously changes to receive the second frequency at 425.

At time frame C, the base unit's receiver 210 and the remote unit's transmitter 205 become disabled at 415 and 430, respectively. Meanwhile, the base unit's transmitter 205 and the remote unit's receiver 210 are enabled at 410 and 430, respectively. The base unit 110 transmits to the remote unit 120 using the second frequency (actually, the tripled value of the second frequency) that was set by the VCOs 227 and 282 during time frame B. While the base unit 110 is transmitting to the remote unit 120, the VCO 282 of the base unit's receiver 210 changes to receive a third frequency as shown at 420, and the VCO 227 of the remote unit's transmitter 205 also simultaneously changes to the third frequency at 440. Subsequently, at time frame D, the base unit's transmitter 205 and the remote unit's receiver 210 become disabled again at 410 and 430, respectively. And, the base unit's receiver 210 and the remote unit's transmitter 205 become enabled, thus permitting transmission from the remote unit 120 to the base unit 110 using the third frequency (tripled) that was selected by the VCOs 282 and 227 in time frame C. While the remote unit 120 is transmitting to the base unit 10, the VCO 227 of the base unit's transmitter 205 and the VCO 282 of the remote unit's receiver 210 will again change frequencies.

Figure 5:
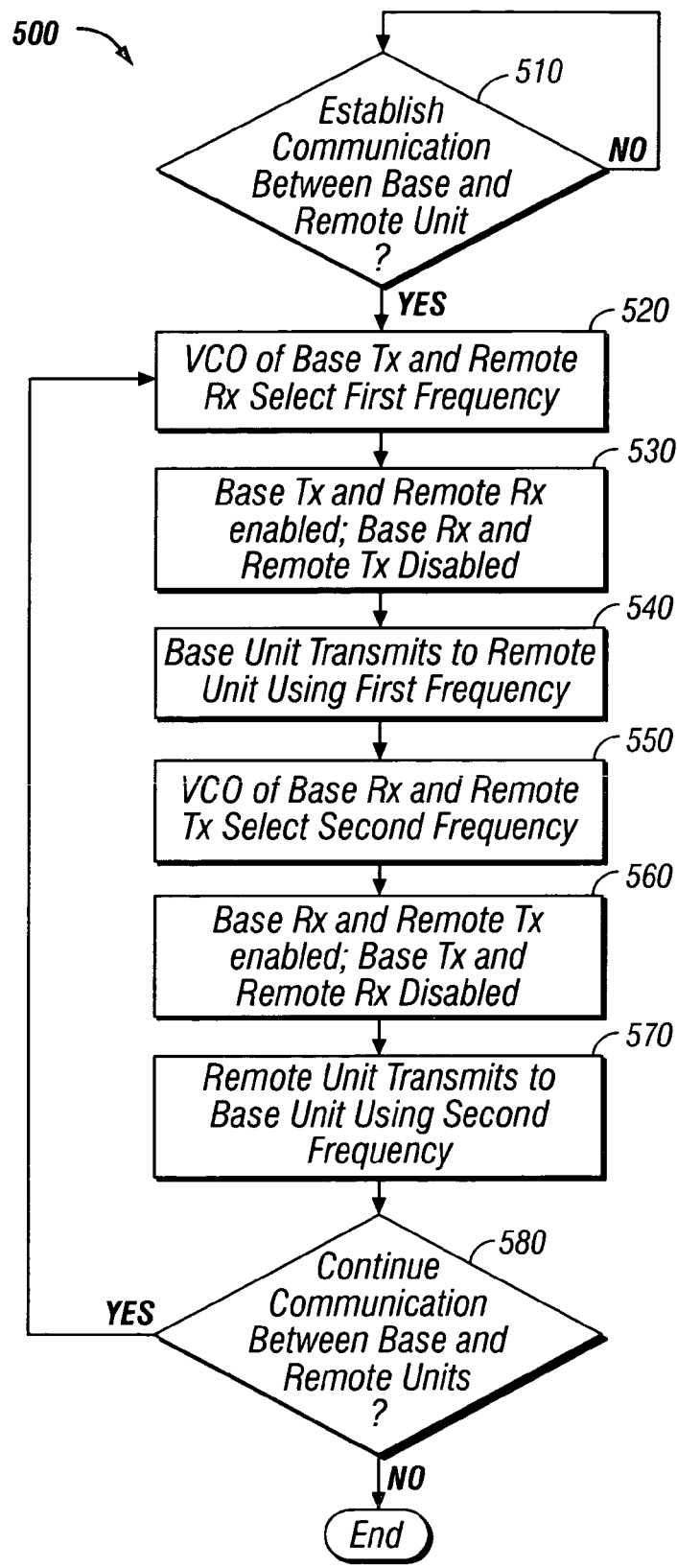
FIG. 5 illustrates a process for transmitting between the base and remote units of FIG. 1 in accordance with one embodiment of the present invention.

Turning now to FIG. 5, a process 500 for transmitting communication signals between the base unit 110 and remote unit 120 is shown in accordance with the present invention. The process 500 commences at step 510 where it is determined whether to establish communication between the base unit 110 and the remote unit 120. In one embodiment, determining to commence communication between the base and remote units 110, 120 may be in response to a user actuating a communication request button (not shown) on the remote unit 120 or an incoming call being received by the base unit 110 via the PSTN 140. It will be appreciated, however, that the occurrence of a number of different types of events could cause communication to be established between the base and remote units 110, 120, and, thus, need not be limited by the aforementioned examples.

If communication between the base and remote units 110, 120 is not desired, the process 500 reverts back to step 510. However, if communication is desired, the process 500 continues to step 520 where the VCO 227 of the base unit's transmitter 205 and the VCO 282 of the remote unit's receiver 210 select a first frequency from the pseudorandomly-ordered frequency hopping pattern generated by the controller 220. At step 530, the base unit's transmitter 205 and the remote unit's receiver 210 are enabled, and the base unit's receiver 210 and remote unit's transmitter 205 are disabled by each respective unit's controller 220. The base unit 110 subsequently transmits communication signals to the remote unit 120 during a first time frame, at step 540, using the first frequency (tripled) selected in step 520. The VCO 282 of the base unit's receiver 210 and the VCO 227 of the remote unit's transmitter 205 selects a second frequency at step 550. In the illustrated embodiment, step 550 is performed substantially simultaneously as step 540 is performed. That is, the VCO 282 of the base unit's receiver 210 and the VCO 227 of the remote unit's transmitter 205 selects the second frequency upon the base unit 110 transmitting signals to the remote unit 120.

At step 560, the base unit's receiver 210 and the remote unit's transmitter 205 are enabled by the controller 220, and the base unit's transmitter 205 and the remote unit's receiver 210 are disabled. The remote unit 120 transmits to the base unit 110 during a second time frame, at step 570, using the second frequency (tripled) that was selected in step 550. Next at step 580, it is determined whether communication between the base and remote units 110, 120 is to continue. In one embodiment, such determination could be made by the user of the remote unit 120 actuating a termination button (not shown), for example. If communication between the base and remote units 110, 120 is to terminate at step 580, the process 500 ends. However, if communication is to continue between the base and remote units 110, 120, then the process 500 reverts back to step 520, where the VCOs 227 and 282 of the base and remote unit's transmitter and receiver 205, 210, respectively select a new frequency in the second time frame. Selection of this new frequency in step 520 is then used for transmission from the base unit 110 to the remote unit 120 in a third time frame in step 540.

It will be appreciated that steps 550–570 could be performed prior to steps 520–540 without departing from the spirit or scope of the present invention. That is, either the remote unit's transmitter 205 or the base unit's transmitter 205 could be set to the first frequency to initiate the frequency hopping sequence.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for transmitting communication between first and second communication units over a plurality of radio frequencies, the method comprising:
   setting the first and second communication units to respectively transmit and receive communication over a first radio frequency during a first time frame;
   selecting an initial frequency by a voltage controlled oscillator of the first and second communication units and multiplying the initial frequency by a frequency multiplier to select a second radio frequency during a time period within the first time frame; and
   setting the first and second communication units to respectively receive and transmit communication over the second radio frequency during a second time frame.

2. The method of claim 1, wherein multiplying the initial frequency by a frequency multiplier to select the second radio frequency, further comprises:
   selecting the second radio frequency by the first and second communication units during the first time frame.

3. The method of claim 1, further comprising:
   selecting a third radio frequency during the second time frame; and
   setting the first and second communication units to respectively transmit and receive communication over the third radio frequency during a third time frame.

4. The method of claim 3, wherein selecting the third radio frequency, further comprises:
   selecting a third radio frequency by the first and second communication units during the second time frame.

5. The method of claim 1, wherein setting the first and second communication units to respectively transmit and receive communication over the first radio frequency during the first time frame, further comprises:
   setting a transmitter of the first communication unit and a receiver of the second communication unit over the first frequency to respectively transmit and receive communication between the first and second communication units during the first time frame.

6. The method of claim 1, wherein setting the first and second communication units to respectively receive and transmit communication over the second radio frequency during the second time frame, further comprises:

setting a receiver of the first communication unit and a transmitter of the second communication unit over the second radio frequency to respectively receive and transmit communication between the first and second communication units during the second time frame.

7. The method of claim 3, wherein setting the first and second communication units to respectively transmit and receive communication over the third radio frequency during the third time frame, further comprises:

setting a transmitter of the first communication unit and a receiver of the second communication unit over the third radio frequency to respectively transmit and receive communication between the first and second communication units during the third time frame.

8. The method of claim 1, wherein multiplying the initial frequency by a frequency multiplier to select the second radio frequency during the time period within the first time frame, further comprises:

selecting an initial frequency by the voltage controlled oscillator of the first and second communication units and tripling the initial frequency by the frequency multiplier to select the second radio frequency during the first time frame.

9. The method of claim 3, wherein selecting the third radio frequency during the second time frame, further comprises:

selecting an initial frequency by the voltage controlled oscillator of the first and second communication units and tripling the initial frequency by the frequency multiplier to select the third radio frequency during the second time frame.

10. The method of claim 1, wherein the first communication unit is a base unit and the second communication unit is a remote unit of a cordless telephone system.

11. An apparatus, comprising:

a first and second communication units for communication there between over a plurality of radio frequencies, the first and second communication units each including:

a controller adapted to set the first and second communication units to respectively transmit and receive communication over a first radio frequency during a first time frame, select an initial frequency by a voltage controlled oscillator of the first and second communication units and multiplying the initial frequency by a frequency multiplier to select a second radio frequency during a time period within the first time frame, and set the first and second communication units to respectively receive and transmit communication over the second radio frequency during a second time frame.

12. The apparatus of claim 11, wherein the controller is further adapted to select a third radio frequency during the second time frame, and set the first and second communication units to respectively transmit and receive communication over the third radio frequency during a third time frame.

13. The apparatus of claim 11, wherein said first and second communication units further comprise:

a transmitter; and a receiver; and wherein the controller is further adapted to set the transmitter of the first communication unit and the receiver of the second communication unit over a first radio frequency to respectively transmit and receive communication between the first and second communication units during the first time frame.

14. The apparatus of claim 13, wherein the controller is further adapted to set the receiver of the first communication unit and the transmitter of the second communication unit over the second radio frequency to respectively receive and transmit communication between the first and second communication units during the second time frame.

15. The apparatus of claim 12, wherein said first and second communication units further comprise:

a transmitter; and a receiver; and wherein the controller is further adapted to set the transmitter of the first communication unit and the receiver of the second communication unit over the third radio frequency to respectively transmit and receive communication between the first and second communication units during the third time frame.

16. The apparatus of claim 13, wherein the transmitter and receiver of the first and second communication units each includes:

a voltage controller oscillator controlled by a phase-locked loop; and a frequency multiplier; and wherein the voltage controlled oscillator is adapted to select an initial frequency and the frequency multiplier is adapted to triple the initial frequency to select the second radio frequency during the first time frame.

17. The apparatus of claim 15, wherein the transmitter and receiver of the first and second communication units each includes:

a voltage controller oscillator controlled by a phase-locked loop; and a frequency multiplier; and wherein the voltage controlled oscillator is adapted to select an initial frequency and the frequency multiplier is adapted to triple the initial frequency to select the second radio frequency during the third time frame.

18. The apparatus of claim 11, wherein the apparatus is a cordless telephone system.

19. The apparatus of claim 11, wherein the first communication unit is a base unit and the second communication unit is a remote unit of a digital cordless telephone system.

20. The apparatus of claim 19, wherein the base unit is coupled to a public switched telephone network (PSTN).

* * * * *